July 21, 1970 J. W. MILLER 3,521,163
GALVANOMETER MOUNTING ASSEMBLY PERMITTING LIMITED
UNIVERSAL GALVANOMETER POSITIONING
Filed May 23, 1966 2 Sheets-Sheet 1

INVENTOR.
JOHN W. MILLER
BY
George C. Sullivan
Agent

July 21, 1970  J. W. MILLER  3,521,163
GALVANOMETER MOUNTING ASSEMBLY PERMITTING LIMITED
UNIVERSAL GALVANOMETER POSITIONING
Filed May 23, 1966  2 Sheets-Sheet 2

INVENTOR.
JOHN W. MILLER
BY
Agent

United States Patent Office

3,521,163
Patented July 21, 1970

3,521,163
GALVANOMETER MOUNTING ASSEMBLY PERMITTING LIMITED UNIVERSAL GALVANOMETER POSITIONING
John W. Miller, Smyrna, Ga., assignor to Lockheed Aircraft Corporation, Los Angeles, Calif.
Filed May 23, 1966, Ser. No. 552,135
Int. Cl. G01r *13/38, 1/04*
U.S. Cl. 324—97      8 Claims

ABSTRACT OF THE DISCLOSURE

A mounting assembly for one or more generally elongate electrical devices such as an optical galvanometer. For example, a galvanometer is retained in a passage through a mounting block by means of a pair of rotary electrodes positioned at opposite sides of the galvanometer. Each of the rotary electrodes includes an electrical conducting surface which is connectable to the galvanometer circuit and which contacts a corresponding portion of the galvanometer. The galvanometer is movable in the limiting confines of the passage for positional adjustment when a retaining set screw engaging one of the rotary electrodes is loosened.

---

This invention relates in general to a mounting assembly and in particular to a mounting assembly which may be used in cooperation with one or more optical galvanometers.

In the field of instrumentation, a device known as an optical galvanometer frequently is used to make a record of an electrical signal. Such optical galvanometers commonly take the form of a small mirror secured to a support which is caused to move as a function of the magnitude or some other variable of the signal being measured. A beam of illumination is directed from a suitable source to this mirror and thence to a suitable photosensitive recording medium, and mirror movements caused by a varying signal are translated into fluctuations in the beam of light striking the recording medium as reflected from the mirror. The recording medium may be in the form of a movable web to provide a time base against which a signal may be measured.

In actual practice a galvanometer recorder frequently contains a plurality of the aforementioned optical galvanometers. One such recorder recently in use contains 52 such galvanometers receiving illumination from a common source and reflecting 52 separate beams of illumination onto a common moving web recording medium to produce 52 separate traces thereon. Inasmuch as the width of this recording web must be minimized to the greatest practical extent due to considerations of recorder size and expense of recording medium, it is apparent that each beam of illumination must strike the recording medium at a precisely defined location under no-signal conditions. Adjustment of this location is conveniently effected by making relatively slight adjustments in the position of the optical galvanometer as a unit. Once the galvanometers have been correctly positioned, however, the galvanometers must be securely retained in position so that subsequent movement or vibration of the recorder apparatus does not vary the position of the optical galvanometers contained therein. While some galvanometer recorders of the prior art have included provision for making such adjustment, such adjustment typically is possible only by rotation of the optical galvanometer on its longitudinal axis. This sort of adjustment obviously enables the location of the illumination beam on the recording medium to be adjusted only in one plane of movement. Also, some types of prior art multiple galvanometer mounts are designed so that it is difficult to make a positional adjustment of one galvanometer without inadvertently affecting the position of an adjacent galvanometer.

According to the present invention, there is provided an optical galvanometer mounting assembly which overcomes or substantially alleviates the adjustment problems of prior art optical galvanometer mounts and which permits independent and universal adjustment of an optical galvanometer within a predetermined range while enabling electrical signals to be supplied to the galvanometer without requiring direct electrical connection therewith.

Accordingly, it is an object of this invention to provide an improved mounting assembly.

Another object of this invention is to provide an improved optical galvanometer mounting assembly.

A further object of this invention is to provide an improved optical galvanometer mounting assembly of the type permitting positional adjustment of a galvanometer.

Still another object of this invention is to provide an optical galvanometer mounting assembly permitting universal positional galvanometer adjustment within a predetermined range of adjustment.

Yet another object of this invention is to provide an optical galvanometer mounting assembly which permits mounting of the plurality of galvanometers in a relatively limited amount of space while enabling each such galvanometer to be universally positioned within a predetermined range of adjustment.

A still further object of this invention is to provide an optical galvanometer mounting assembly which permits universal positional galvanometer adjustment within a predetermined range of adjustment while establishing an electrical circuit including the galvanometer.

The exact nature of this invention as well as other objects and advantages thereof will be readily apparent from consideration of the following specification relating to the annexed drawings in which.

Stated generally, this invention includes a mounting block containing therein one or more passages within which may be received a corresponding number of optical galvanometers. A pair of rotary electrodes rotatably contained within a chamber provided for each passage formed in the mounting block serves to clamp each of the optical galvanometers in a predetermined position and to permit one or more of these galvanometers to be re-positioned within the confines of the passages when the clamping effect is lessened. These electrodes also serve to transfer to the optical galvanometers the electrical signals undergoing measurement.

Figure 1:
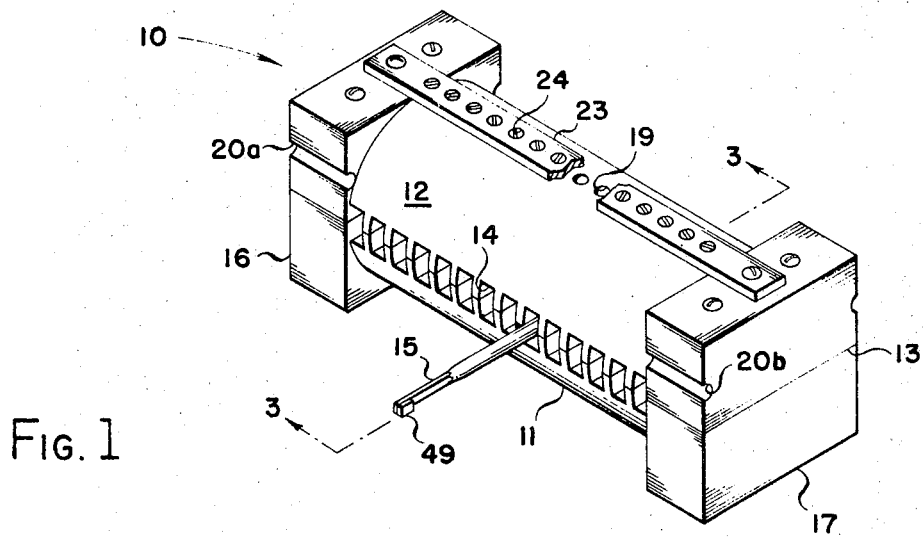
FIG. 1 shows an isometric view of one embodiment of an assembled galvanometer mounting assembly according to this invention and having a number of optical galvanometers mounted therein.

More particularly and with reference taken to the drawings, there is shown in FIG. 1 thereof a mounting block indicated generally at 10 and including a lower member 11 and an upper member 12 which meet along a parting line 13 to form the mounting block. The mounting block contains therein a number of passages 14 extending substantially completely through the mounting block, with each of these passages being of sufficient size to permit installation of an optical galvanometer 15 and to permit this galvanometer to be universally swiveled within predetermined limits as set forth below. The mounting block includes a pair of generally rectangular end portions 16 and 17 through which bolts or other suitable fasteners 18 extend for securely retaining together lower member 11 and upper member 12. Each of lower member 11 and upper member 12 has a number of holes 19 formed therein and aligned along a plane substantially at right angles to the longitudinal axes of passages 14. Disposed over holes 19 on upper member 12 only is an electrically conductive bus bar 23 having therein a threaded opening 24 corresponding to the location of each of holes 19. Of course, it will be understood that the number of passages 14 in the mounting block is determined by the number of galvanometers 15 to be mounted. Slots 20a and 20b contained in end portions 16 and 17 may be used for retentive and/or alignment engagement with corresponding structural members on an oscillograph recorder of which this invention may comprise a subcomponent.

Figure 2:
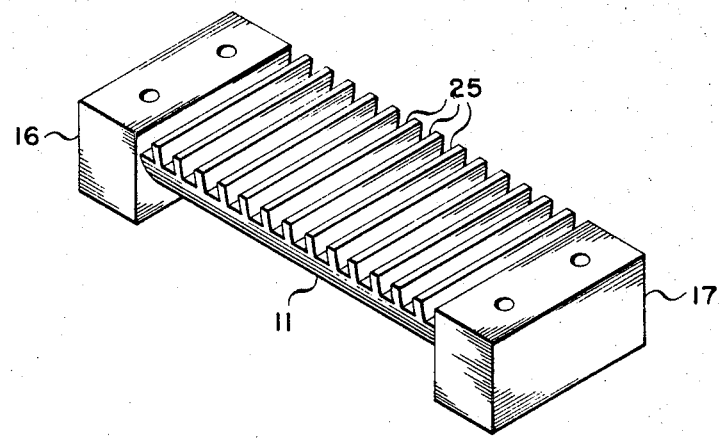
FIG. 2 shows an isometric view of one of the halves of the assembly of FIG. 1.

Turning now to FIG. 2, there is shown in isometric view the lower member 11. Inasmuch as the internal configuration of lower member 11 is identical to that of upper member 12, only one of these members is shown and described in detail herein. Each of members 11 and 12 is made of a suitable dielectric material such as plastic or the like, and each has one or more channels 25 formed therein so that when lower member 11 and upper member 12 are brought together to form mounting block 10 the channels 25 coincide to define passages 14. The channels are formed by a series of wall members 26 which may be formed integrally with lower member 11.

Figure 3:
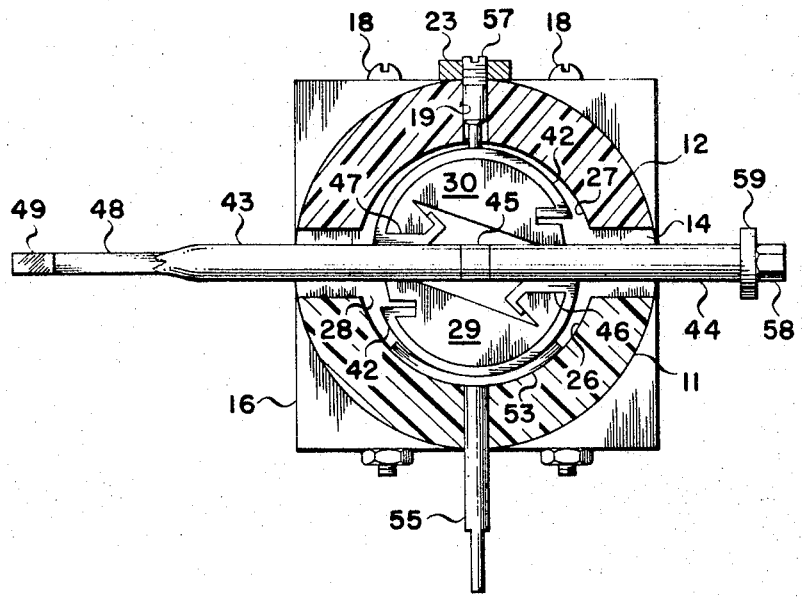
FIG. 3 shows a partial sectional view taken along line 3—3 of FIG. 1.

As best shown in FIG. 3, it is seen that the channels 25 of each of lower member 11 and upper member 12 have a generally semi-circular cutout region 26 and 27, respectively, intermediate the ends of the channels. These cutout regions 26 and 27 are positioned such that holes 19 of upper member 12 and corresponding holes 19 of lower member 11 are substantially perpendicular to the surfaces of the respective cutout regions when lower member 11 and upper member 12 are brought together to form mounting block 10, as shown in FIG. 3. The mounting block 10 thus contains a pair of opposed hemi-cylindrical cutout regions which define chamber 28.

Figure 4:
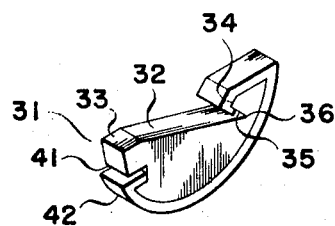
FIG. 4 shows an isometric view of one of the rotary electrodes shown in FIG. 3.

Contained within each chamber 28 are a pair of substantially identical rotary electrodes 29 and 30. As seen more clearly in FIG. 4, each of these rotary electrodes includes a generally semicircular disk 31 made of a suitable dielectric material and having a notch 32 cut or otherwise formed in the flat side 33 thereof. Beveled surface 34 and adjoining surface 35 combine to form an acute angle 36 at one end of notch 32. On the curved exterior of disk 31 and adjacent the end of flat side 33 opposite from the location of acute angle 36, there is a slot 41 formed in the disk. Disposed on the curved exterior of disk 31 is a striplike electrical conductor 42 extending from slot 41 around the curved exterior, over part of the flat portion of the semicircle, and terminating adjacent acute angle 36. Electrical conductor 42 may be fabricated from a strip of a suitable metal stock such as brass or the like and may then be installed on disk 31. Alternatively, any other suitable technique for applying an electrically conductive layer to the appropriate surfaces of disk 31 may be used. This electrical conductor 42 may be protected by any suitable technique such as silver plating or the like to render the conductor relatively resistant to corrosion.

Returning to FIG. 3, it can be seen that optical galvanometer 15 is of the type having a generally cylindrical barrel comprising a forward electrically conductive body portion 43 and a rearward electrically conductive body portion 44 separated by a dielectric spacer 45. Galvanometer 15 is retained in mounting block 10 between a pair of rotary electrodes 29 and 30, with these electrodes being oppositely positioned as shown such that the segment 46 of the electrical conductor 42 contained on the flat portion of rotary electrode 29 abuts rearward body portion 44, while the corresponding segment 47 of rotary electrode 30 abuts forward body portion 43 of the galvanometer. Contained within the region defined by notches 32 of the two electrodes is dielectric collar 45.

Figure 5:
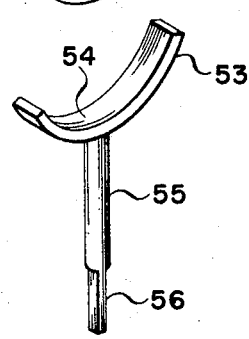
FIG. 5 shows an isometric view of the rotary electrode contact member shown in FIG. 3.

Galvanometer body portions 43 and 44 are electrically connected to piezoelectric element 48 having mirror 49 secured thereto, and application of a suitable voltage across these body portions causes a corresponding deflection of the piezoelectric element and the mirror. This electrical circuit is established through the provision of rotary electrode contact member 53 received in chamber 28 of lower member 11 between the striplike electrical conductor 42 on the curved portion of rotary electrode 29 and the corresponding chamber-defining curved wall portion of the lower member. This contact member, best shown in FIG. 5, has a generally semicircularly shaped curved contact portion 54 having secured thereto a feed-through post 55. A suitable electrical connector 56 is provided at the other end of feed-through post 55 to facilitate attachment to the appropriate electrical circuit.

A common electrical return for all of the galvonometers in the mounting block 10 is provided by means of an electrically conductive setscrew 57 threadedly engaged in opening 24 of bus bar 23 and in contacting relationship with the electrical conductor 42 of rotary electrode 30. As shown in FIG. 1, bus bar 23 extends the length of upper member 12 to provide a common electrical return for each galvanometer contained in the block; however, if electrical isolation of some or all of such galvanometers is desirable, this can readily be provided by substituting suitable individual setscrew retaining elements for common bus bar 23.

In the operation of this invention, the mounting block 10 is assembled as described above with galvanometer 15 supported between rotary electrodes 29 and 30 and with electrically conductive relationship being established between these electrodes and contact member 53 and setscrew 57, respectively. Precise positional adjustment of galvanometer 15 is accomplished by loosening setscrew 57 so that the rotary electrodes no longer firmly retain the galvanometer in place. At this time, galvanometer 15 may if desired be rotated about an imaginary axis extending into the plane of FIG. 3, such rotation causing corresponding rotation of rotary electrodes in the respective cutout regions 26 and 27. Galvanometer 15 may also be rotated on its longitudinal axis, such rotation being facilitated by the provision at 58 of a suitable wrenching connector adapted to receive a suitable tool such as an Allen wrench or the like. Galvanometer 15 also may be displaced along its longitudinal axis to whatever extent necessary so long as conductive segments 46 and 47 remain in conductive contacting relationship with the corresponding body portions 44 and 43 of the galvanometer. Galvanometer 15 additionally may be rotated transversely about an imaginary axis generally extending through openings 19 and 28, the extent of such rotation as well as the extent of the afore-described rotation about the imaginary axis extending into FIG. 3 being limited only by the physical dimensions of passage 14 relative to the size of galvanometer 15.

Once the desired position of the galvanometer has been attained, tightening of setscrew 57 causes the galvanometer to be securely retained between the two rotary electrodes. Because the thrust of setscrew 57 is applied to the rotary electrodes substantially through the center of rotation of disks 31 and because the thickness of the rotary electrodes is only slightly less than the corresponding dimension of chamber 28, this tightening of setscrew 57 does not produce any rotation or other movement of rotary electrodes 29 and 30 which might tend to adversely affect the position of the galvanometer. Collar 59 secured to rearward body portion 44 of the galvanometer is of sufficient diameter to prevent the galvanometer from being inadvertently extended into passage 14 so far that the galvanometer becomes lost therein or the rotary electrodes become shorted by the rearward body portion.

In the assembly arrangement of FIG. 3, setscrew 57 and bus bar 23 are at an electrical potential different from that of wrenching connection 58. Since on making a positional adjustment of the galvanometer typically may have a suitable wrench in one hand and engaged with wrenching connection 58 while simultaneously holding with the other hand a screwdriver or other tool which is engaged with setscrew 57, it can be seen that the electrical potential across the galvanometer also is applied across the hands of the person making the adjustment. While the use of insulated tools prevents this dangerous circumstance from occurring automotically, the danger still exists that one's hands could inadvertently contact the metal parts of the tools being used. If the apparatus of this invention is used with voltage levels harmful to personnel, the foregoing danger can be obviated simply by reversing the assembled position of rotary electrodes 29 and 30 so that conductive segment 46 of electrode 29 engages forward body portion 43 and conductive segment 47 of electrode 30 engages rearward body portion 44. By doing this, setscrew 57 and wrenching connection 58 are always at the same electrical potential.

From the foregoing description, it can be seen that there has been provided a galvanometer mounting assembly which enables an optical galvanometer mounted therein to be completely universally positioned within predetermined limits established by the dimensions of the assembly. In a mounting assembly of this type, the internal dimensions of the lower and upper members only indirectly affect the position assumed by a galvanometer retained therein, since the precisely defined final positioning of the galvanometer is accomplished by positional adjustment. For this reason, the relative location and correlation of these dimensions with respect to the remainder of an oscillograph recorder of which this mounting assembly is a component need not be controlled with that degree of preciseness required of prior art galvanometer mounting assemblies. This means that the galvanometer mounting assembly of this invention is correspondingly less expensive to manufacture, inasmuch as lower member 11 and upper member 12 may, by way of example, be formed of plastic through conventional molding techniques. Since each galvanometer and the pair of rotary electrodes associated therewith are contained in a separate chamber and have a separate retaining setscrew, each galvanometer can be adjusted without disturbing the positioning of the other galvanometers in the mounting assembly.

It should be understood, of course, that the foregoing relates to only a preferred embodiment of the invention, and that numerous modifications or alterations may be made therein without departing from the spirit and scope of the invention as set forth in the appended claims.

What is claimed is:

1. A mounting assembly for an optical galvanometer of the type including a generally elongate body member having a first electrically conductive region and a second electrically conductive region electrically insulated from the first such region, comprising:
   a mounting block having at least one passage extending therethrough,
      said mounting block having a hollow region interiorly thereof to form a chamber communicating with and intermediate the ends of said passage; and
   first and second galvanometer support electrodes positioned in said chamber in opposed relationship, said first galvanometer support electrode having an electrically conductive portion positioned to establish electrical contact with the first conductive region and said second galvanometer support electrode having an electrically conductive portion positioned to establish electrical contact with the second conductive region of a galvanometer received between said galvanometer support electrodes.

2. Apparatus as in claim 1, wherein:
   the cross section dimensions of said passage are substantially greater than the corresponding dimensions of the galvanometer intended to be received therein to permit universal positioning of the galvanometer in said passage within a predetermined range of movement.

3. Apparatus as in claim 1, wherein:
   at least a portion of the wall of said chamber is in the form of a curved surface;
   each of said galvanometer support electrodes having a curved surface portion complementary to said curved surface of said chamber wall to enable a galvanometer received between said galvanometer support electrodes to be positioned by means of rotation of said galvanometer support electrodes relative to said mounting block; and further including
   biasing means selectively engageable with at least one of said galvanometer support electrodes and operative to urge said galvanometer support electrodes and a galvanometer received therebetween into a fixed position relative to said mounting block.

4. Apparatus as in claim 1, wherein:
   said chamber has the shape of a pair of opposed generally hemi-cylindrical recesses, and
   each of said galvanometer support electrodes has a complementary recess engaging portion of generally hemi-cylindrical shape and being rotatably received within a corresponding one of said recesses,
      each of said galvanometer support electrodes additionally having a galvanometer engaging portion on which said electrically conductive portion is located.

5. Apparatus as in claim 4, wherein:
   said galvanometer engaging portion of each of said galvanometer support electrodes has a dielectric region and an electrically conductive region,
   said galvanometer support electrodes being positioned in said chamber such that a galvanometer received therebetween has a first electrically conductive region retained between said dielectric region of said first galvanometer support electrode and said electrically conductive region of said second galvanometer support electrode and has a second electrically conductive region retained between said electrically conductive region of said first galvanometer support electrode and said dielectric region of said second galvanometer support electrode.

6. Apparatus as in claim 5, wherein:
   at least one of said galvanometer support electrodes has an electrically conductive surface over at least a part of said recess engaging portion thereof and in electrical communication with said electrically conductive region thereof; and further comprising
   an electrode contact member having an arcuate portion configured to be conformingly received between the wall of one of said generally hemi-cylindrical recesses and said electrically conductive surface of said one galvanometer support electrode having said electrically conductive surface to establish electrical contact between said arcuate portion and said electrically conductive region of said one of said galvanometer support electrodes,
      said electrode contact member having a connector portion attached to said arcuate portion and extending to enable connection thereto of an electrical signal to be applied to the galvanometer.

7. Apparatus as in claim 6, further comprising:
   biasing means selectively engageable with at least one of said galvanometer support electrodes and operative to urge said galvanometer support electrodes and a galvanometer received therebetween into a fixed position relative to said mounting block.

8. Apparatus as in claim 7, wherein:

said biasing means comprises an electrically conductive member selectively retained in a bore contained in said mounting block and extending into communication with the other of said generally hemicylindrical recesses, said electrically conductive member having an end portion adapted to establish selective contact with said galvanometer support electrode received in said other recess to bias said galvanometer support electrodes toward each other.

References Cited

UNITED STATES PATENTS

| | | | |
|---|---|---|---|
| 3,001,167 | 9/1961 | Chesutt et al. | |
| 3,048,642 | 8/1962 | Parker. | |
| 3,289,149 | 11/1966 | Pawloski | 339—183 |
| 3,328,741 | 6/1967 | Brown | 339—7 |
| 2,873,429 | 2/1959 | Atchley et al. | 324—97 X |
| 2,882,498 | 4/1959 | Turre | 324—97 X |
| 2,908,866 | 10/1959 | Heiland et al. | 324—97 |

ALFRED E. SMITH, Primary Examiner

U.S. Cl. X.R.

324—156; 339—7

PO-1050
(5/69)

UNITED STATES PATENT OFFICE
CERTIFICATE OF CORRECTION

Patent No. __3,521,163__  Dated __July 21, 1970__

Inventor(s) __John W. Miller__

It is certified that error appears in the above-identified patent and that said Letters Patent are hereby corrected as shown below:

In Column 1, line 6, "Los Angeles" should read -- Burbank --.

SIGNED AND
SEALED

OCT 27 1970

(SEAL)
Attest:

Edward M. Fletcher, Jr.
Attesting Officer

WILLIAM E. SCHUYLER, JR.
Commissioner of Patents